United States Patent Office 2,904,547
Patented Sept. 15, 1959

2,904,547
METAL SALTS OF FORMOSULFATHIAZOLE

Nathan Grossowicz and Shabbetai Ratner, Jerusalem, Israel, assignors to Ciba Pharmaceutical Products Inc., Summit, N.J.

No Drawing. Application November 25, 1957
Serial No. 698,338

Claims priority, application Israel December 6, 1956

1 Claim. (Cl. 260—239.65)

This invention relates to metal salts of formo-sulfathiazole with divalent metals, especially magnesium, and their manufacture.

The new compounds have valuable bacteriostatic and bactericidal properties and can be used as medicaments. The magnesium salt of formo-sulfathiazole, for instance, is highly active against *Escherichia coli*, *Proteus vulgaris*, *Pseudomonas aeruginosa*, *Salmonella typhi*, *Shigella dysenteriae*, *Vibrio cholerae*, *Staphylococcus aureus*, and the like. It is also effective against the microorganisms responsible for tonsillitis, angina, scarlet fever, erysipelas and pneumonia, i.e. pyogenic streptococci and pneumococci. Its activity in vivo is greater than that of sodium-sulfathiazole, and it is less toxic. It protects mice against fatal infections, e.g. with pyogenic streptococci, pneumococci and *Salmonella typhi*. It also proved its worth in clinical tests in that it could be used successfully against infections produced by *Escherichia coli*, *Proteus vulgaris*, *Pseudomonas aeruginosa*, *Streptococci fecalis*, *Staphylococcus aureus* and similar bacteria. The drug was well tolerated and showed no side effects.

The new compounds are obtained when sulfathiazole or a salt thereof is reacted, in a diluent, in either order of succession, with formaldehyde and a soluble salt of a divalent metal. In a preferred embodiment of the process, the metal salt, especially a magnesium salt, primarily magnesium sulfate, is added to a hot saturated aqueous solution of sodium-sulfathiazole, and then a 40% aqueous solution of formaldehyde is added. After the addition of formaldehyde the solution is allowed to cool, and the resulting salt is filtered off. For purification, the metal salt of sulfathiazole obtained as intermediate product can be crystallized by allowing the solution to cool. It can be filtered off and recrystallized from hot water.

In another embodiment of the process, the sodium sulfathiazole is dissolved in a solution of formaldehye, while heating slightly, and the metal salt, for example, magnesium sulfate-hydrate, preferably half an equivalent, is added. Heating is then continued until the new salt begins to crystallize.

In the above reactions the formaldehyde may be replaced by an agent yielding formaldehyde. The invention also comprises any modification of the process in which there is used as starting material the condensation product of formaldehyde and sulfathiazole or a salt of sulfathiazole with a divalent metal, especially magnesium, and the remaining process steps are carried out.

The new compounds can be used as medicaments, for example, in the form of pharmaceutical preparations which contain them or salts thereof in admixture with a therapeutically useful pharmaceutical organic or inorganic solid or liquid carrier material suitable for enteral or parenteral application. For the production of these preparations such substances are concerned as do not react with the new compounds, as for example water, gelatine, lactose, starch, magnesium stearate, talc, vegetable oils, benzyl alcohols, gums, polyalkylene glycols, white petroleum jelly cholesterol, or other known medicament carriers. The pharmaceutical preparations can take the form of, for example, tablets or dragees, salves, creams, or are in liquid form as solutions, suspensions or emulsions. They are sterilized if desired, and/or may contain auxiliary substances such as preservatives, stabilizing, wetting or emulsifying agents, salts which vary the osmotic pressure, or buffer substances. They may also contain other therapeutically valuable substances.

The following example illustrates the invention. The temperatures are in degrees centigrade.

27.8 grams of sodium-sulfathiazole are dissolved in 40 cc. of water, and 12.3 grams of magnesium sulfate-heptahydrate are added to the resulting solution, after which the magnesium salt of sulfathiazole crystallizes. The whole is allowed to stand at 0° for 2 hours, then filtered with suction, and the residue dissolved in 200 cc. of hot water. The milky turbidity is removed by filtration while hot, the filtrate allowed to stand at 0°, the crystallized magnesium salt separated by filtration and dissolved in 100 cc. of water. At 60–65° there are added to the clear solution 30 cc. of 40% aqueous formaldehyde solution after which a milky white precipitate is produced immediately. The latter gradually becomes fine grained. Cooling in ice-water for 2 hours is followed by suction-filtering, washing in cold water, and drying at 50° overnight. The magnesium salt of formo-sulfathiazole so obtained is a white powder. It is but sparingly soluble in cold water and has an alkaline reaction to litmus. It probably has the formula

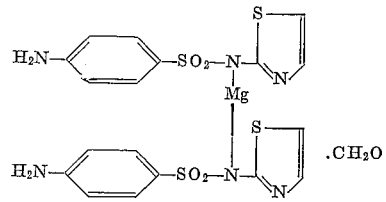

What is claimed is:
The magnesium salt of formo-sulfathiazole.

References Cited in the file of this patent
UNITED STATES PATENTS

| | | |
|---|---|---|
| 2,411,495 | Dohrn | Nov. 19, 1946 |
| 2,512,102 | Hartmann et al. | June 20, 1950 |

FOREIGN PATENTS

| | | |
|---|---|---|
| 624,380 | Great Britain | June 7, 1949 |
| 247,344 | Switzerland | Nov. 13, 1943 |

OTHER REFERENCES

Bose et al.: Chem. Absts., vol. 49, col. 6485e (1955).
Basu: Chem. Absts., vol. 44, col. 1441 (1950).
Druey: Helv. Chim. Acta, vol. 31 (1948), pp. 179–183.
Bhatnagar et al.: Nature, vol. 164 (1949), pp. 272–273.